US012125629B2

(12) United States Patent
Tarasinski et al.

(10) Patent No.: US 12,125,629 B2
(45) Date of Patent: *Oct. 22, 2024

(54) TRANSFORMER WITH INTEGRATED COOLING

(71) Applicant: Deere & Company, Moline, IL (US)

(72) Inventors: Nicolai Tarasinski, Frankenthal (DE); Volker Kegel, Mannheim (DE); Dennis Kremer, Weidenthal (DE)

(73) Assignee: DEERE & COMPANY, Moline, IL (US)

(*) Notice: Subject to any disclaimer, the term of this patent is extended or adjusted under 35 U.S.C. 154(b) by 785 days.

This patent is subject to a terminal disclaimer.

(21) Appl. No.: 17/336,430

(22) Filed: Jun. 2, 2021

(65) Prior Publication Data

US 2021/0287844 A1 Sep. 16, 2021

Related U.S. Application Data

(63) Continuation of application No. 15/889,860, filed on Feb. 6, 2018, now Pat. No. 11,031,175.

(30) Foreign Application Priority Data

Feb. 10, 2017 (DE) ......................... 102017202124.1

(51) Int. Cl.
*H01F 27/28* (2006.01)
*H01F 27/12* (2006.01)

(52) U.S. Cl.
CPC ......... *H01F 27/2876* (2013.01); *H01F 27/12* (2013.01); *H01F 27/125* (2013.01)

(58) Field of Classification Search
CPC ...... H01F 27/2876; H01F 27/12; H01F 27/08; H01F 27/10; H01F 27/105; H01F 27/125; H01F 27/16

(Continued)

(56) References Cited

U.S. PATENT DOCUMENTS 2,985,707 A * 5/1961 Ahearn .................. H01F 27/08 174/15.1
3,261,905 A 7/1966 Allen (Continued)

FOREIGN PATENT DOCUMENTS

CN 104240917 A * 12/2014
DE 102012208545 11/2013

(Continued)

OTHER PUBLICATIONS

German Search Report issued in counterpart application No. 102017202124.1 dated Oct. 25, 2017. (12 pages).

(Continued)

*Primary Examiner* — Tszfung J Chan
(74) *Attorney, Agent, or Firm* — McDonald Hopkins LLC; James P. Muraff

(57) ABSTRACT

A transformer with integrated cooling is disclosed. The transformer comprises a primary winding and a secondary winding, and a coolant line partly or completely embedded in at least one of the primary or secondary windings. The coolant line is supplied with coolant from a supply device. The coolant line has a plurality of exit holes that are arranged to lead in a direction of at least one of the primary or secondary winding, so as to supply it with coolant.

20 Claims, 2 Drawing Sheets

(58) Field of Classification Search
USPC ............................................... 336/55, 57–62
See application file for complete search history.

(56) References Cited

U.S. PATENT DOCUMENTS

| | | | | |
|---|---|---|---|---|
| 3,444,307 | A * | 5/1969 | Kafka | H01F 6/06<br>174/29 |
| 6,157,282 | A | 12/2000 | Hopkinson | |
| 7,830,237 | B1 | 11/2010 | Chen | |
| 2010/0248968 | A1 | 9/2010 | Stautner | |
| 2010/0315161 | A1 | 12/2010 | Morozov et al. | |
| 2013/0207763 | A1 | 8/2013 | Wagoner et al. | |
| 2015/0061807 | A1* | 3/2015 | Chu | H01F 27/28<br>336/170 |
| 2015/0123756 | A1* | 5/2015 | Hyde | H01F 27/2876<br>336/55 |

FOREIGN PATENT DOCUMENTS

| | | | | |
|---|---|---|---|---|
| JP | S56107536 | | 8/1981 | |
| JP | S5878406 | | 5/1983 | |
| JP | S6065503 | | 4/1985 | |
| JP | 6071124 | U * | 5/1985 | |
| JP | 6073210 | U * | 5/1985 | |
| JP | S6071124 | | 5/1985 | |
| JP | S6073210 | | 5/1985 | |
| JP | S6280314 | | 5/1987 | |
| WO | WO-2015144177 | A1 * | 10/2015 | F03D 80/60 |

OTHER PUBLICATIONS

European Search Report issued in counterpart application No. EP18154040.2, dated Jul. 9, 2018. (20 pages).

* cited by examiner

TRANSFORMER WITH INTEGRATED COOLING

CROSS-REFERENCE TO RELATED APPLICATIONS

This application is a continuation of U.S. application Ser. No. 15/889,860 entitled, "Transformer With Integrated Cooling" filed on Feb. 6, 2018, which claims priority to patent commonly owned DE patent application no. 102017202124.1, filed Feb. 10, 2017, the entire disclosure of which is hereby incorporated herein by reference.

FIELD OF THE DISCLOSURE

The present disclosure relates generally to electrical transfer devices, and more particularly to a transformer with integrated cooling.

BACKGROUND OF THE DISCLOSURE

Transformers having water-cooled electric coils are well known in the art. Such transformers comprise laminated cores and multilayer windings applied thereon. A coolant line made as a flexible hose is wound around the outer surface of the winding and coolant flows through the coolant line to cool the coil or winding. According to a variant design of the coil, an inner arrangement of the coolant line between the layers of the winding is also proposed.

Drawbacks to such transformer designs include the inability to optimize the transformer at the start with regard to its power density through a further improvement of the cooling performance. As such, there is a need in the art for an improved transformer that overcomes the limitations of the conventional systems.

SUMMARY OF THE DISCLOSURE

According to an aspect of the present disclosure, a transformer with integrated cooling is provided. The transformer comprises a primary winding and a secondary winding. A coolant line is partly or completely embedded in at least one of the primary winding or the secondary winding. The coolant line is supplied with coolant from a supply device. The coolant line comprises a plurality of exit holes that are arranged to lead in a direction of at least one of the primary winding or the secondary winding, so as to supply it with coolant.

A particularly good heat dissipation is ensured by the immediate flushing of the windings that are to be cooled with coolant, which leads to a corresponding improvement of the power density of the transformer. The heated coolant in this case can flow away between the windings of the at least one winding in the direction of a collecting receiver and from there can be sent, by means of a coolant pump, which is a part of the supply device, to a heat exchanger for dissipation of the collected waste heat. An automatic distribution of the coolant within the relevant winding of the transformer is guaranteed because of the capillary action of adjacent turns.

In laboratory tests a power density of more than 5 kw/kg was achieved using a transformer fitted with the integrated cooling described above.

The transformer can, for example, be a mid-frequency transformer for frequencies in the range of a few 100 hz up to a few 1000 hz, which is a component of a power transmission line between a power supply station and an electrically operated agricultural vehicle, for example an agricultural tractor. To reduce power losses the transmission of the electric power typically takes place at the medium voltage level, which necessitates a vehicle-side adjustment (reduction) to the onboard voltage level. For this purpose the transformer can be designed as a two- or three-phase transformer.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
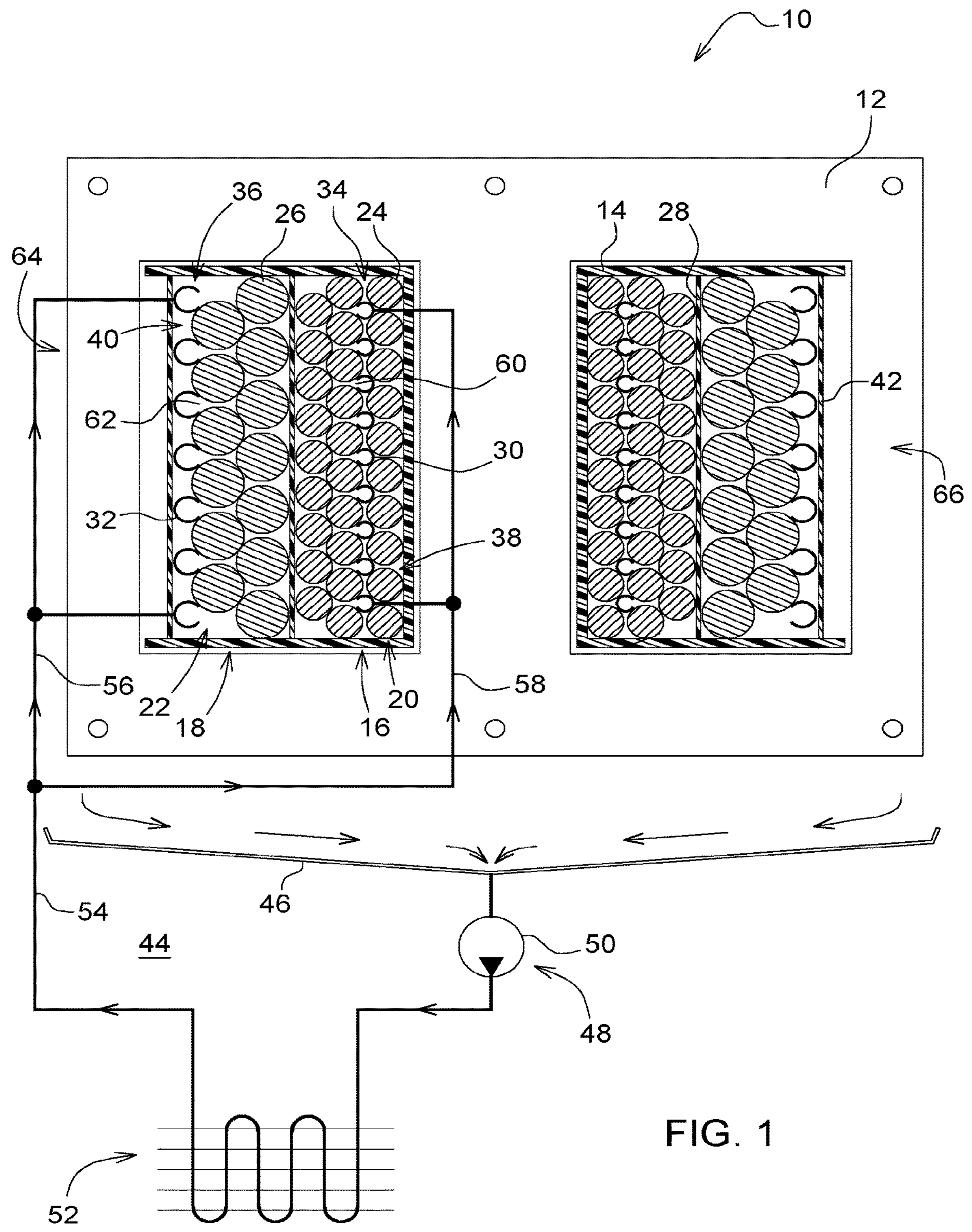
FIG. 1 is a schematic cross-sectional view of a transformer according to an embodiment.

Referring to FIG. 1, a transformer 10 is shown according an embodiment. In embodiments, the transformer 10 can comprise a laminated stack 12 and a winding body 14 of plastic arranged on the laminated stack 12. The winding body 14 carries an inner primary winding 16 and an outer secondary winding 18. Each of the windings 16, 18 has a plurality of winding layers 20, 22. The individual turns 24, 26 of the winding layers 20, 22 consist of enameled copper wire or enamel-insulated stranded wire (e.g., litz wire). An insulation layer 28 consisting of plastic film runs between the two windings 16, 18.

In some embodiments, the transformer 10 can comprise a voltage reducer, in which the turns 24 of the primary winding 16 have a smaller diameter than the turns 26 of the secondary winding 18. In addition, a first coolant line 30 and a second coolant line 32 can be provided, where the first coolant line 30 is wound in the form of an intermediate layer 34 around an inner (first) winding layer 20 of the secondary winding 16 and the second coolant line 32 in the form of an outer layer 36 is wound around an outer (last) winding layer 22 of the secondary winding 18. As can be seen from FIG. 1, the coolant lines 30, 32 each run along the interstices 38, 40 formed by adjacent turns 24, 26, so that they are partly or completely embedded in the relevant winding 16, 18. The secondary winding 18 in this case is surrounded together with the second coolant line 32 by an additional shielding insulation layer 42.

Additionally, in some embodiments, the two coolant lines 30, 32 are a component of a coolant loop 44, which consists of a collecting receiver 46, a coolant pump 50 comprised of a supply device 48, a heat exchanger 52 for dissipation of collected waste heat, and associated lines 54, 56, and 58. The collecting receiver 46 is formed by a base trough of an outer housing (not shown) of the transformer 10.

Each of the coolant lines 30, 32 has a plurality of exit holes 60, 62, which lead in the direction of the relevant winding 16, 18, so as to supply or to flush it directly with coolant. More precisely, the first coolant line 30 has exit holes 60 that are unidirectionally distributed along its wall, whereas the second coolant line 32 has exit holes 62 that are exclusively directed inwardly along its wall.

The heated coolant then exits at the rear sides 64, 66 of the primary and secondary windings 16, 18, so as to flow from there back into the collecting receiver 46 under the effect of gravity. In embodiments, the coolant lines 30, 32 can each be formed as flexible hose lines which comprise heat-resistant plastic such as, for example, PTFE, silicone, or Viton. The number and/or distribution of the exit holes 60, 62 along the walls of the coolant lines 30, 32 is determined in this case on the basis of experiments and/or computer-supported simulations.

For example, the first coolant line 30 has an inside diameter of about 2 to 4 mm and the second coolant line 32 has an inside diameter of about 5 to 7 mm. The exact inside diameter, like the diameters of the exit holes 60, 62, is dependent on various factors, in particular the viscosity of the coolant that is used, the volume output of the coolant pump 50, the resistance of the windings 16, 18 to flow, the power loss to be dissipated, and the like. The coolant flowing through the coolant lines 30, 32 is a nonconductive coolant liquid with noncorrosive properties, for example a heat-resistant oil such as silicone oil.

Figure 2:
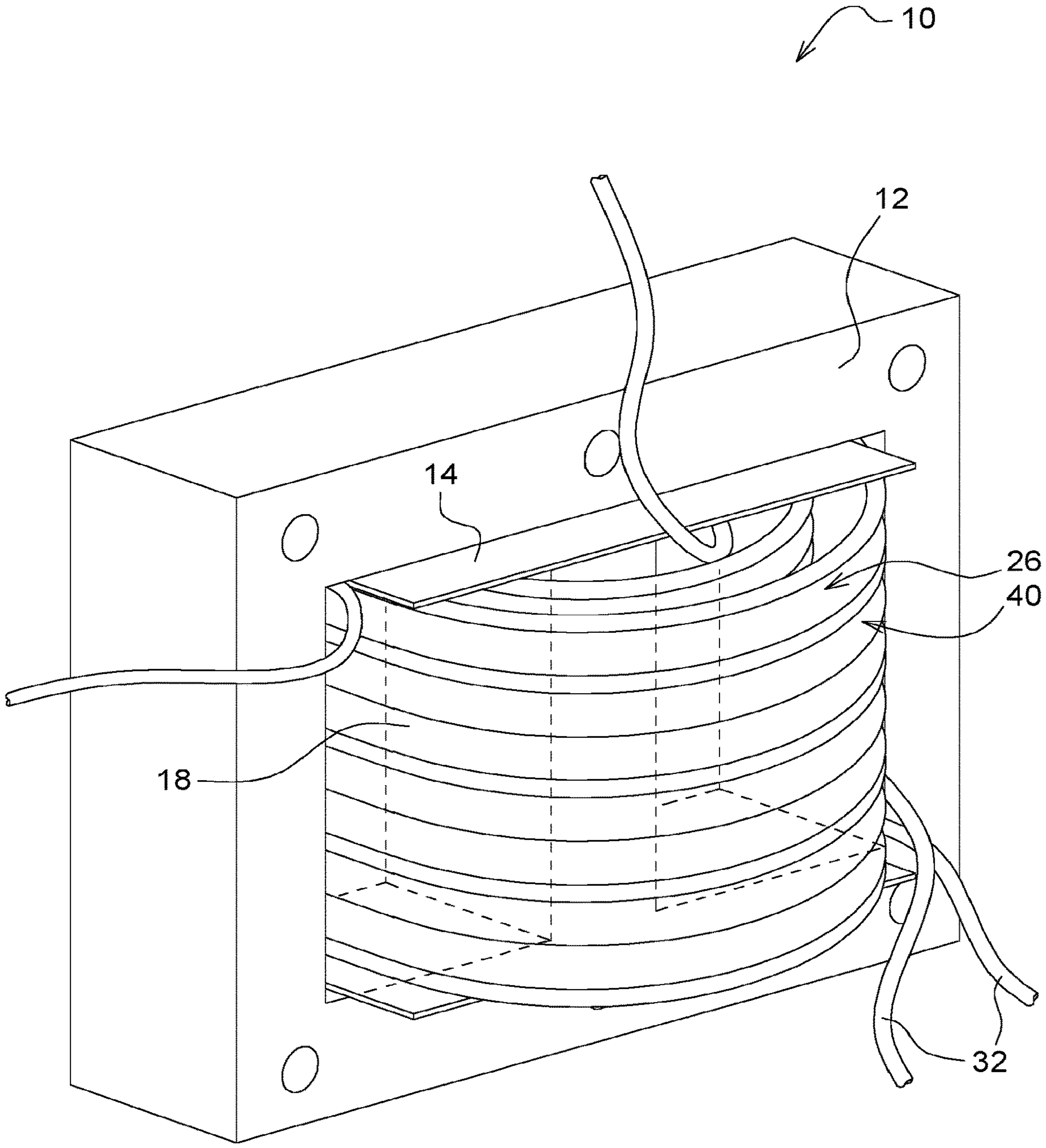
FIG. 2 is a perspective external view of the transformer shown in FIG. 1.

Referring to FIG. 2, a perspective outside view of the transformer 10 as discussed with reference to FIG. 1 is shown. In FIG. 2, the additional insulation layer 42 is omitted, so that the course of the second coolant line 32 along the interstices 40 formed by the adjacent turns 26 of the secondary winding 18 can be seen.

In some embodiments, the transformer 10 can comprise a mid-frequency transformer for frequencies in the range of a few 100 hz to a few 1000 hz, which is a component of a power transmission line (not shown) between a power supply station and an electrically operated agricultural vehicle, for example an agricultural tractor. To reduce power losses the transmission of electric power takes place at the medium voltage level, which necessitates a vehicle-side adjustment (reduction) to the onboard voltage level. For this the transformer 10 is designed as a two- or three-phase transformer.

Without in any way limiting the scope, interpretation, or application of the claims appearing below, a technical effect of one or more of the example embodiments disclosed herein a transformer with integrated cooling. Advantageous embodiments of the transformer according to the invention follow from the dependent claims. Preferably, the coolant line is made as a flexible hose line and consists of heat-resistant plastic such as PTFE, silicone, or Viton. The number and/or distribution of the exit holes along the wall of the coolant line is determined on the basis of experiments and/or computer supported simulations.

In addition, the coolant line can be wound in the same direction as the at least one winding, so that interstices within the affected winding, which lead to possible field inhomogeneities and thus power losses, can be reduced. The coolant line in this case can run between adjacent turns of one and the same winding layer or can form a separate (intermediate) layer.

In particular, a first and/or second coolant line can be provided, where the first coolant line is wound around an inner winding layer of the primary winding and/or the second coolant line is wound around an outer winding layer of the secondary winding. Such a configuration is particularly advantageous when an insulation layer and/or an hf shield (consisting of copper foil) is provided between the primary and secondary winding of the transformer and so the use of a common coolant line is not possible because of the spatial separation. In other words, the two coolant lines each run as far as possible in the edge region of the winding packet formed by the primary and secondary windings, so that undesirable field inhomogeneities within the winding packet, including the power losses that are produced by that, can largely be avoided.

In this case there is the possibility that the first coolant line has exit holes unidirectionally distributed and arranged along its wall, so that coolant flows over the primary winding from the inside outward.

Correspondingly, it is possible that the second coolant line has exit holes directed only inwardly along its wall, which allows the coolant to be employed only to cool the secondary winding. The heated coolant arrives at the rear sides of the primary and secondary windings so as to flow back from there into the collecting receiver under the effect of gravity.

For the case where the transformer is made as a voltage reducer, thus the power losses occurring on the secondary are greater than the primary losses, it turned out to be advantageous if the first coolant line has an inside diameter of 2 to 4 mm and/or the second coolant line has an inside diameter of 5 to 7 mm. The exact inside diameter is dependent-like the diameters of the exit holes-on various factors, in particular the viscosity of the coolant that is used, the coolant pump output, the flow resistance of the windings, the power loss that is to be dissipated, and the like. The coolant flowing through the coolant line is preferably a nonconductive coolant liquid with noncorrosive properties, for example a heat-resistant oil such as silicone oil.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A transformer with integrated cooling, comprising:
- a primary winding;
- a secondary winding;
- a first coolant line wound around an inner winding layer of the primary winding, the first coolant line defining first exit holes unidirectionally distributed and arranged along a wall of the first coolant line, so that coolant flows over the primary winding from an inside of the primary winding outward; and
- a second coolant line wound around an outer winding layer of the secondary winding, the second coolant lines defining second exit holes directed inwardly along a wall of the second coolant line.

2. The transformer of claim 1, further comprising a collecting tray receiver, and wherein the coolant that has been delivered by the first coolant line and the second coolant line arrives at rear sides of the primary and secondary windings respectively so as to flow back from there into the collecting receiver under the effect of gravity.

3. The transformer of claim 1, further comprising an insulation layer separating the primary winding and the secondary winding.

4. The transformer of claim 1, further comprising a high-frequency shield separating the primary winding and the secondary winding.

5. The transformer of claim 1, wherein the second coolant line is wound around the secondary winding between an outermost winding layer and an outer barrier of the transformer.

6. The transformer of claim 1, wherein the first coolant line is wound around the primary winding between two adjacent winding layers of the primary winding.

7. The transformer of claim 1, wherein the primary winding is comprised of a first winding layer, a second winding layer, and a third winding layer.

8. The transformer of claim 5, wherein the second coolant line is wound around the secondary winding, and wherein the second exit holes are directed to interstices formed by adjacent turns of the secondary winding.

9. The transformer of claim 1, wherein the first coolant line has a smaller inside diameter than the second coolant line.

10. The transformer of claim 9, where the first coolant line has an inside diameter of 2 to 4 millimeters and the second coolant line has an inside diameter of 5 to 7 millimeters.

11. The transformer of claim 1, wherein the first coolant line runs along and is partially embedded within interstices formed by adjacent turns of the primary winding.

12. The transformer of claim 1, wherein second coolant line runs along and is partially embedded within interstices formed by adjacent turns of the secondary winding.

13. The transformer of claim 1, wherein the second exit holes are directed only inwardly along the wall of the second coolant line such that the coolant employed though second coolant line only cools the secondary winding.

14. The transformer of claim 13, wherein the coolant directed by the second exit holes cools the secondary winding and does not cool the primary winding.

15. The transformer of claim 13, wherein the second exit holes are configured to provide the coolant to the secondary winding based on a capillary action of adjacent turns of the secondary winding.

16. A transformer with integrated cooling, comprising:

a primary winding;

a secondary winding;

a first coolant line, the first coolant line running along an interstice formed by adjacent turns of the primary winding and is embedded partly or completely in the primary winding, the first coolant line defining exit holes unidirectionally distributed in the direction of the primary winding to supply the primary winding with coolant; and a second coolant line, the second coolant line running along an interstice formed by adjacent turns of the secondary winding and is embedded partly or completely in the secondary winding, the second coolant line defining exit holes unidirectionally distributed in the direction of the second winding to supply the secondary winding with the coolant.

17. The transformer of claim 16, wherein the first and second coolant lines each comprise a flexible hose line, and wherein the flexible hose line comprises a heat-resistant plastic.

18. The transformer of claim 16, wherein the first coolant line is wound around an inner winding layer of the primary winding and the second coolant line is wound around an outer winding layer of the secondary winding.

19. The transformer of claim 16, wherein the exit holes of the second coolant line are directed exclusively inwardly towards the secondary winding.

20. The transformer of claim 16, wherein the exit holes of the first coolant line are directed exclusively outwardly toward inner winding layers of the primary winding.

* * * * *